United States Patent [19]

Danish

[11] Patent Number: 5,117,455
[45] Date of Patent: May 26, 1992

[54] TELEPHONE KEYPAD MATRIX

[75] Inventor: Adel Danish, Mohandessin, Egypt

[73] Assignee: Danish International, Inc., Foster City, Calif.

[21] Appl. No.: 500,370

[22] Filed: Mar. 28, 1990

[51] Int. Cl.⁵ .................. H04M 1/272; G06F 3/02
[52] U.S. Cl. .................................. 379/368; 341/22; 341/28; 40/337
[58] Field of Search .............. 379/368, 355, 354; 341/20, 22, 23, 28; 40/337

[56] References Cited

U.S. PATENT DOCUMENTS

| | | |
|---|---|---|
| 3,778,553 | 12/1973 | Rackman . |
| 3,967,273 | 6/1976 | Knowlton . |
| 4,307,266 | 12/1981 | Messina . |
| 4,400,593 | 8/1983 | Kunz ........................ 341/22 X |
| 4,490,056 | 12/1984 | Whitaker ................. 341/22 X |
| 4,609,792 | 9/1986 | Levasseur ............... 341/22 X |
| 4,658,417 | 4/1987 | Hashimoto et al. . |
| 4,724,423 | 2/1988 | Kinoshita ................. 341/28 |
| 4,727,357 | 2/1988 | Curtin et al. ............ 341/22 |
| 4,737,040 | 4/1988 | Moon ....................... 341/28 X |
| 4,737,980 | 4/1988 | Curtin et al. ............ 341/22 X |
| 4,771,268 | 9/1988 | Sone et al. ............... 341/22 |
| 4,825,464 | 4/1989 | Wen .......................... 379/368 X |
| 4,872,196 | 10/1989 | Royer et al. ............. 341/28 X |

FOREIGN PATENT DOCUMENTS

| | | | |
|---|---|---|---|
| 0154033 | 9/1983 | Japan ...................... | 341/28 |
| 2134294 | 8/1984 | United Kingdom ... | 341/28 |

*Primary Examiner*—James L. Dwyer
*Assistant Examiner*—M. Shehata
*Attorney, Agent, or Firm*—James E. Eakin

[57] ABSTRACT

A method and apparatus for entering alphanumerical characters into a push button telephone system having automatic response functions. Each alphabetic letter and character is assigned a keypair having a dual tone multifrequency signal which is stored in the memory of the telephone system. The code provides for the conversion of analog voice frequency signals to digital signals. The digital signals may be converted to analog signals to provide voice prompts to the caller. The letters and characters are sequentially arrayed on a matrix overlaying the telephone keypad. Characters are positioned above and between the push buttons so that each character may be separately accessed from adjacent keys. Entry of a keypair requires the sequential pressing of at least one key two times. Sequential operations that require the pressing of two different and adjacent keys may be performed in any sequence. The method and apparatus permits the autodialing storage of words and the entry of sets of characters having digits and letters. Digits may be entered by pressing the selected number key followed by a pause. Alternatively, each character may be placed on a separate key on a separate keyboard so that a selected character is entered by pressing a single key to generate the signal identifying the selected character.

16 Claims, 5 Drawing Sheets

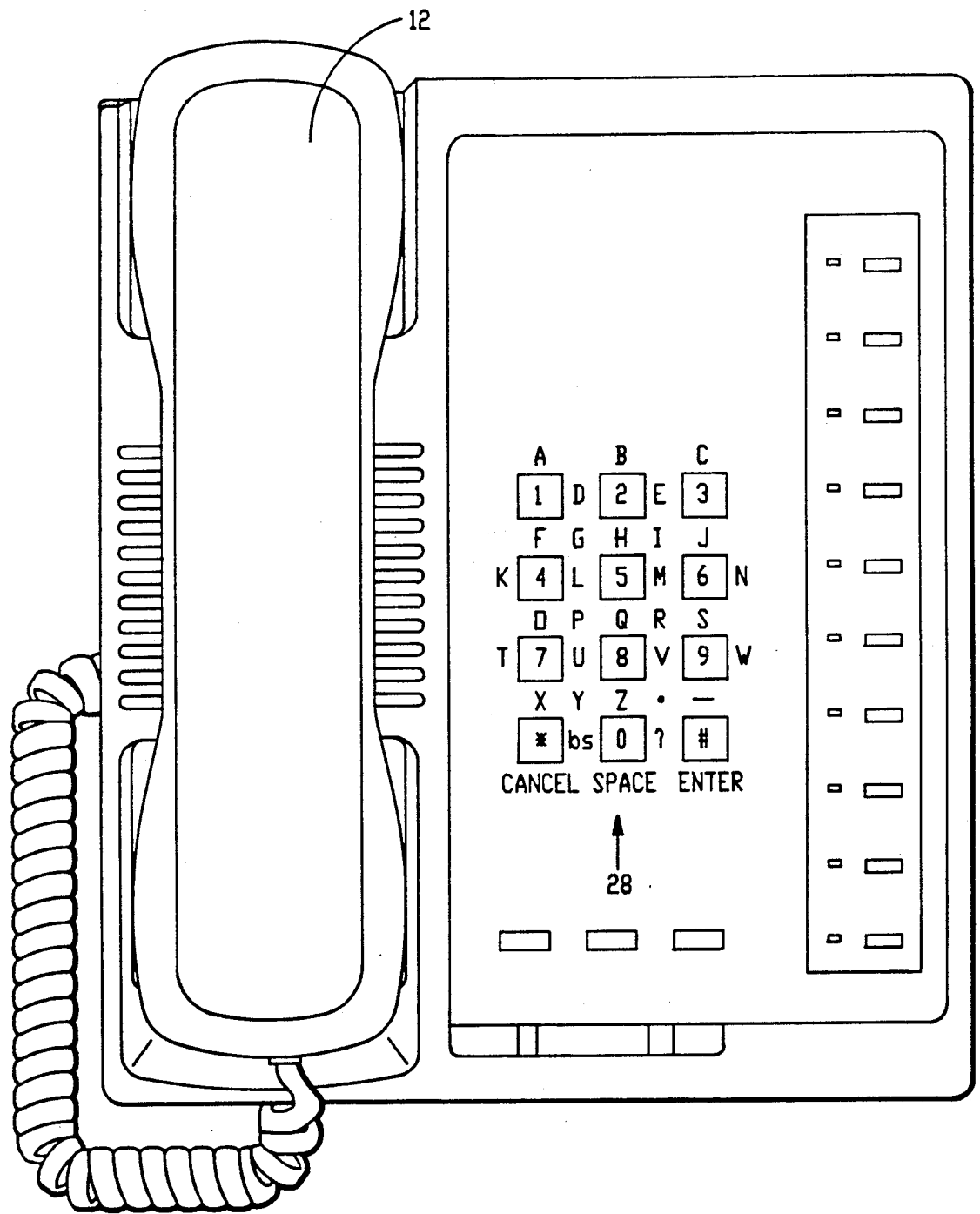
FIG.—4A

TELEPHONE KEYPAD MATRIX

FIELD OF THE INVENTION

The present invention relates to a telephone keypad matrix for the inputting of characters. The invention finds special application for push button telephones for inputting letters of an alphabet, special characters and symbols, and digits.

BACKGROUND OF THE INVENTION

The alphanumeric telephone keypad matrix is known in the art. The universally recognized standard for the push button telephone keypad is a 4×3 matrix having four rows and three columns of buttons, or keys. Each key is preassigned with a single digit or special symbol as a primary assignment, and with three alphabetic characters as a secondary functional assignment.

Automatic response function telephone systems, computerized systems, are designed to route incoming calls from pay or non-pay calling stations to a computer. An incoming call is received and processed by the computer which typically prompts the caller to select the desired service by pressing numeric keys on the telephone keypad. The identity of each numerical key is determined from an analog, dual tone multifrequency signal (DTMF) which is generated upon depressing the numerical key. The DTMF is a combination of two analog voice frequency tones, and it addresses stored digital code. Timing is typically not critical in the entry of DTMF signals for the identification of the numerals of standard, numerical keys. The computer converts the analog DTMF tones into digit signals for processing. The computer may also convert digit signals into analog voice signals for providing acknowledgement/prompt messages to the caller.

For example, by pressing the numeral 1 on the keypad in response to a computerized voice prompt, the caller may be connected to the technical support department, or by pressing the 0 on the keypad, the caller may be connected to an operator for further assistance. Computerized telephone systems may also eliminate voice communication and require the caller to communicate exclusively through the telephone keypad. In one such application wherein a caller desires that information be delivered by facsimile, the caller may press the number key corresponding to the number of the desired document and, upon entry of the start button or the receiving facsimile number, the document will be delivered.

Entry of the letters of the alphabet is desirable for many reasons and purposes including automatic response function telephone systems. For example, the caller's name and address may be needed to complete the telephone transaction.

While the universally recognized 4×3 keypad of the prior art standardizes the physical arrangement of the numeric characters, the physical arrangement of alphabetic characters may vary. One typical push button telephone matrix of the prior art includes twenty four letters of the alphabet, excluding the "Q" and the "Z", arranged on eight of the twelve keys as follows:

| KEY 1 | No letters |
|-------|-----------|
| KEY 2 | ABC |
| KEY 3 | DEF |
| KEY 4 | GHI |
| KEY 5 | JKL |
| KEY 6 | MNO |
| KEY 7 | PRS |
| KEY 8 | TUV |
| KEY 9 | WXY |
| KEY 0 | No letters |
| KEY * | No letters |
| KEY # | No letters |

There are several methods of entering alphabetical characters using the conventional telephone keypad design outlined above. None of the methods provide for the DTMF signal entry of alphabetical characters, and timing of entry is critical in the first prior art method.

The first method requires the caller to locate the desired letter on the telephone keypad and to press the corresponding key either once, twice, or three times, depending upon the location of the desired letter on the key. For example, to enter the name "JONES", the following steps are required:

| KEY 5 | Press once (Pause) |
|-------|---------------------|
| KEY 6 | Press three times (Pause) |
| KEY 6 | Press twice (Pause) |
| KEY 3 | Press twice (Pause) |
| KEY 7 | Press three times (Pause) |

The first method does not permit the caller to enter digits and letters within the same word. The method is time critical in that pressing the Number 1 key three times in a row could provide for the input of the letters C, or AB, or BA, or AAA depending upon the timing between keystrokes. Because the number of keystrokes used to enter letters is not constant, the caller is required to provide considerable concentration to correctly complete the desired entry. In addition, it is difficult to store frequently used words in a system having an autodialing capability because of the necessity for introducing pauses between characters.

A second method for entering letters of the alphabet requires the caller to locate and press the key bearing the desired letter and then to press the key bearing the numeral corresponding to the position of the desired letter on the key. For example, to enter the letter "H", the caller must first press the number four key which bears the letter "H", and must then press the number two key because the "H" is the "second" letter on the number four key. The following steps are required to enter the name "JONES" using the second method:

| KEY 5 | Press once |
|-------|-----------|
| KEY 1 | Press once (Pause) |
| KEY 6 | Press once |
| KEY 3 | Press once (Pause) |
| KEY 6 | Press once |
| KEY 2 | Press once (Pause) |
| KEY 3 | Press once |
| KEY 2 | Press once (Pause) |
| KEY 7 | Press once |
| KEY 3 | Press once |

Although the second method standardizes the number of keystrokes for each letter, it requires considerable concentration by the caller to properly complete the required keystrokes.

As can be seen from the above summary of the prior art, an unsolved need exists for a simple method and apparatus for inputting alphabetical and numeric characters into a telephone system.

SUMMARY OF THE INVENTION WITH OBJECTS

A general object of the invention is to provide a method and apparatus for inputting alphabetical and numerical characters into a telephone system in a manner that overcomes the limitations and drawbacks of the prior art.

A specific object of the present invention is to provide a method and apparatus for the conversion of a standard telephone keypad to a keypad having full alphanumeric DTMF entry capability.

One further object of the present invention is to provide a method and apparatus for entering letters of the alphabet into a telephone system in a manner that enables the caller to store desired words in an auto-dialing memory of a push button telephone.

One more object of the present invention is to provide a method and apparatus for a telephone system for enabling the caller to enter a set of characters having both alphabetical and digital components.

Yet another object of the present invention is to provide an internationally standardized method and apparatus for the logical entry of alphabetical and numerical characters into a telephone system.

Still another object of the present invention is to provide a keypad that may be attached to a telephone system for the entry of alphabetical and numerical characters.

Yet one more object of the present invention is to enable a caller to apply a minimum of concentration while using a rapid, visually simple, method and apparatus for entering characters into a telephone system in a manner that is dependent upon the physical location of the characters on the keypad, and is independent of the key labels.

Still one more object of the present invention is to provide a bidirectional, telephone keypad entry method for entering a key pair used to define an alphabetical character.

In accordance with the present invention, a method and apparatus is provided for the conversion of a standard push button telephone keypad into a matrix affording the user full alphanumeric DTMF entry. The method employs the standardized telephone matrix to prearrange the alphabetical letters in a manner enabling single or adjacent keypairs to be defined for each alphabetical letter. DTMF signals are generated by the single or adjacent keypairs and are transmitted to conventional voice tone recognition apparatus and storage facilities. Each keypair for each alphabetical character is provided with a stored, binomial code.

A rectangular overlay matrix defines twelve openings for placement over the keys of a twelve key, standardized push button telephone keypad. The openings are arranged to correspond to the standard 4×3 keypad matrix in that four parallel, horizontal rows each having three axially aligned openings are defined. The axially aligned openings form three vertical columns.

The letters of the alphabet and enumerated special characters are individually and sequentially prearranged on the matrix so that the letters and characters are aligned above, to the left and to the right, and diagonally between the keys of the keypad. All characters are entered by sequentially pressing bidirectional DTMF keypairs. The two keystrokes required to enter the keypair defining a particular character are determined by the location of that character on the matrix. Alphabetical characters that are located adjacent to a single key are defined by a keypair that is entered by pressing said single key twice. Alphabetical characters and special characters located between and adjacent to two keys are defined by keypairs composed of said two keys, and are entered by sequentially pressing the two keys of the keypair in any order. Alphabetical characters and special characters located between and diagonally adjacent to four keys are defined by keypairs of any two diagonally adjacent keys, and are entered by pressing either of the keypairs in any order. To enter a digital character contained within an alphabetical character set, the corresponding digital key is pressed followed by the pressing of the "pound" sign key or, alternatively, by pressing any key that is located at least two rows or two columns distance from said digital key. Digital characters may also be entered followed by a pause of a duration sufficient to receive the voice tone "echo" prior to pressing keys to enter the next alphanumeric character in the set.

These and other objects, aspects, advantages and features of the present invention will be more fully understood and appreciated upon consideration of the following detailed description of a preferred embodiment, presented in conjunction with the accompanying drawings.

BRIEF DESCRIPTION OF THE DRAWINGS

FIG. 4A is a top plan view of the conventional push button telephone of FIG. 2 showing configuration of the characters according to the principles of the present invention directly upon the keypad.

FIG. 5 is a table showing the keypair entry sequence for each of the alphanumeric characters shown in the matrix in FIG. 4.

DETAILED DESCRIPTION OF A PREFERRED EMBODIMENT

Figure 1:
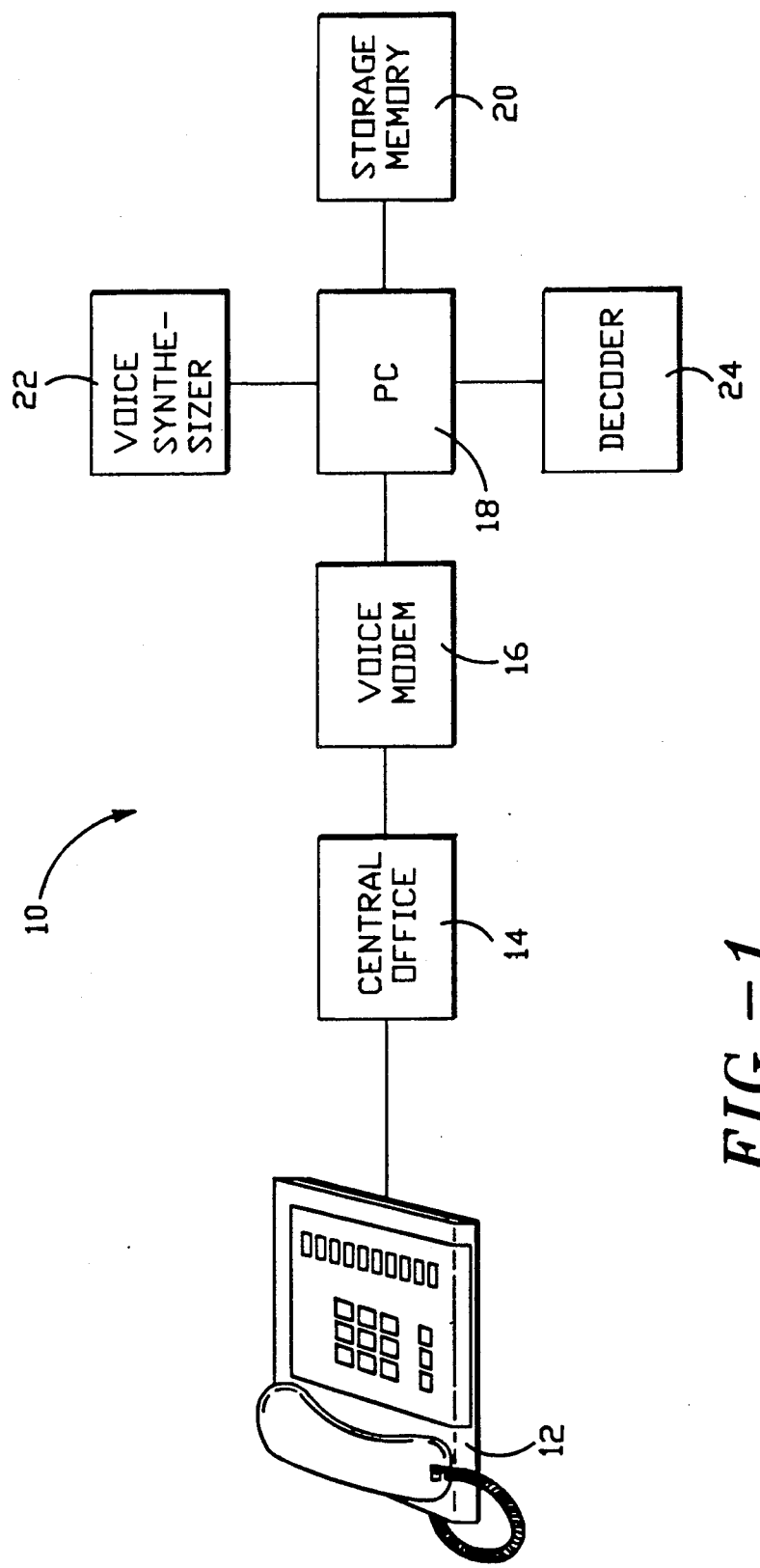
FIG. 1 is a block diagram of a conventional automatic response function telephone system having a 4×3 matrix keypad.

FIG. 1 is a block diagram of the components of a conventional automatic response function telephone system accessible from pay or non-pay calling stations and generally represented by the reference number 10. System 10 includes a user telephone hand set 12 which is a typical twelve key, push button telephone having a 4×3 matrix keypad. Pressing the keys on the hand set 12 produces voice, DTMF signals to identify the selected keys.

The hand set 12 is connected to a privately or centrally operated telephone office 14. A voice modem module 16 is included for providing voice prompts to the caller. The voice module 16 is connected to, or typically installed within, a conventional digital computer 18 having a storage memory 20, a voice synthesizer 22, and a decoder 24.

The memory 20 contains stored, binomial codes corresponding to the voice DTMF signals of the keys of the hand set 12. The stored codes are used by the computer as a look-up table. The decoder 24 uses the stored codes to convert the analog DTMF voice signals into digital data for processing and storage. System 10 also generates responsive voice messages by converting stored digital code into analog signals.

In accordance with the principles of the present invention, the decoder of system 10 includes software or firmware that is programmed to provide digital, binomial code characters for each letter of the alphabet and the desired special characters. In addition to storing codes for converting the analog voice signals to digital signals, stored digital files may be converted to analog voice signals in order to enunciate a message back to the user, for example to signal the user that the correct key sequence has been entered. Known programs and hardware are used to accomplish the digital voice storage capability. For example, a BigmOuth (tm) Pc board and SpeakEasy (tm) software are used to provide the binomial, digital codes for each special character and each alphabetical character. The BigmOuth (tm) system is an IBM compatible system.

Figure 2:
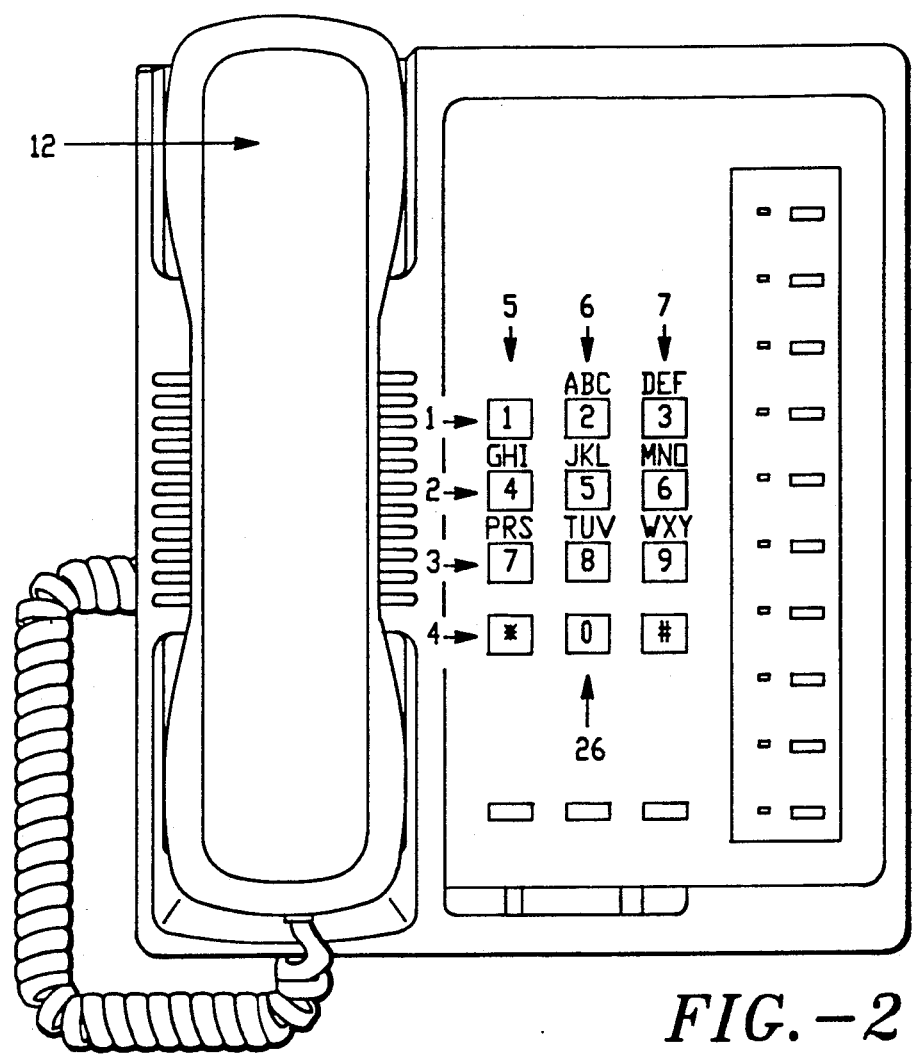
FIG. 2 is, a top plan view of a conventional push button telephone set showing the standard 4×3 matrix keypad.
Figure 3:
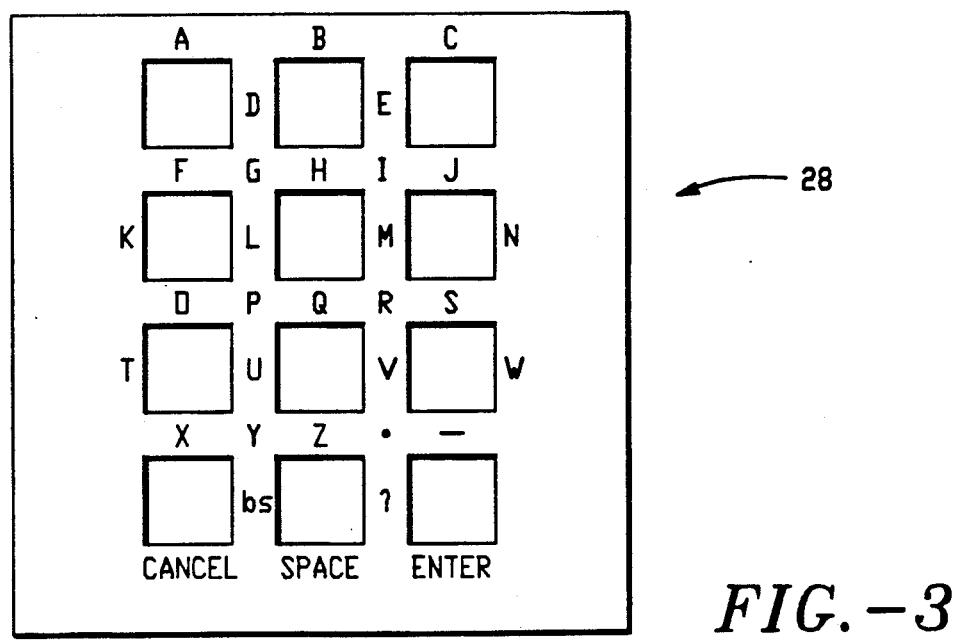
FIG. 3 is a top plan view of a matrix embodying the principles of the present invention.

Referring now to FIGS. 2 and 3, the hand set 12 is shown having a standardized twelve key, push button keypad 26. The twelve keys of keypad 26 are arrayed in the universally recognized 4×3 rectangular matrix which divides the twelve keys into four equidistant and parallel, horizontally arrayed rows 1,2,3, and 4 having three keys in each row. The three aligned keys in each row 1-4 are equidistant and form three vertically arrayed columns 5,6 and 7. Beginning at the first key in row 1, continuing along row 1 and back to the first key in row 2 and so forth, the twelve keys are consecutively numbered from 1 through 9. The "star" key, zero key and pound sign key occupy the three keys in row 4. It will be recognized by those skilled in the art that other key pad arrangements are used and that the matrix of the present invention may be adapted for use with other keypad configurations.

Figure 4:
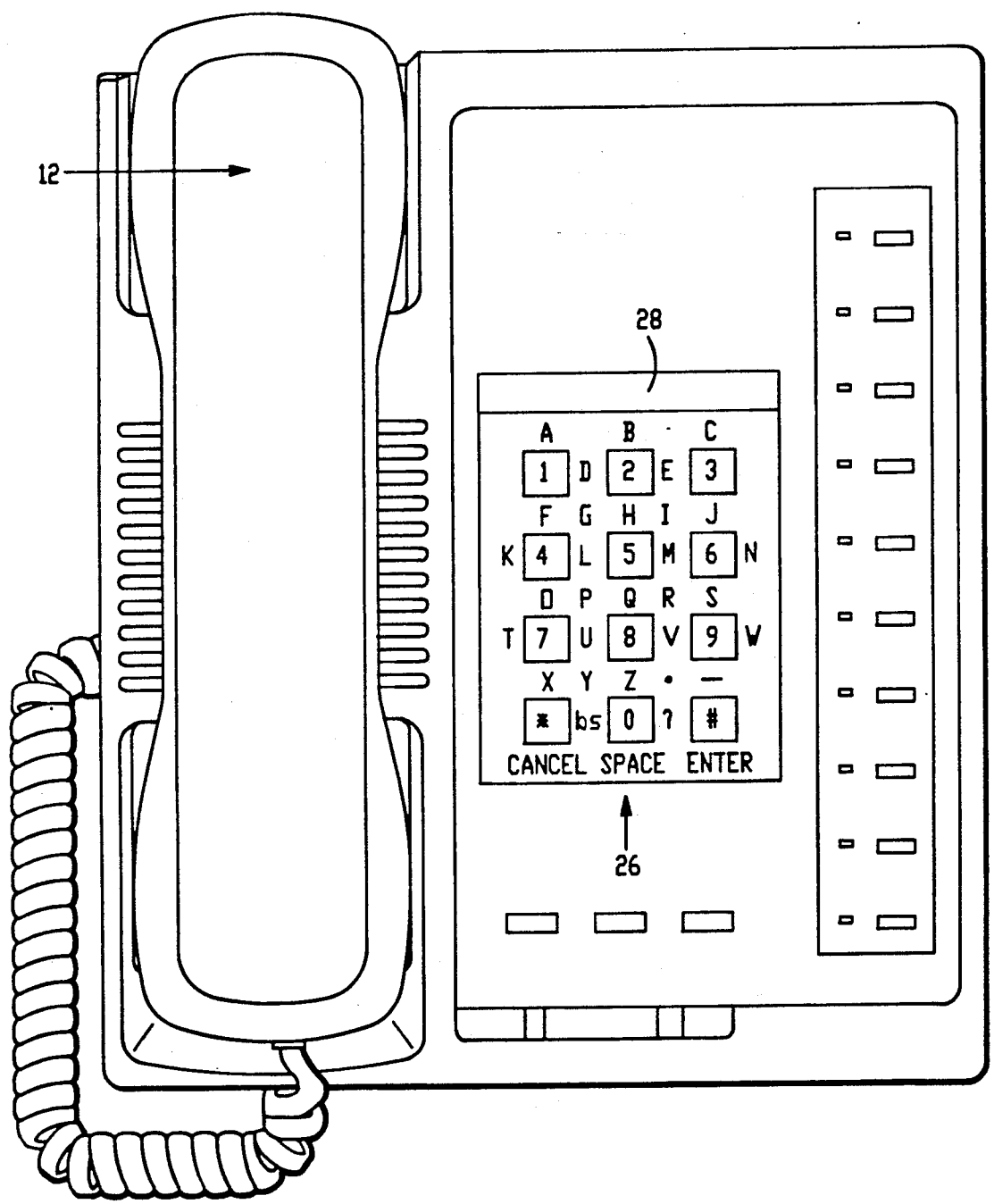
FIG. 4 is a top plan view of the matrix of the present invention shown positioned for use on the conventional push button telephone of FIG. 2.

The matrix 28 of FIG. 3 defines 12 openings corresponding in size and location to the twelve keys of the keypad 26 so that the matrix 28 may be placed over the keys as shown in FIG. 4.

The 26 letters of the English alphabet are singly and progressively prearranged above, below, and between the twelve openings in matrix 28. Each letter occupies a separate site on the matrix 28. As can be seen in FIG. 3, several optional special characters, such as a period, a hyphen, and a question mark are included on the matrix. Cancel, space and enter functions are provided in row 4. Other special characters may be substituted for those shown in FIG. 3. The characters may also be directly configured upon the keypad as shown in FIG. 4A.

All of the characters contained on matrix 28 are entered by sequentially pressing a keypair. Each keypair is defined and coded into memory using the physical location of the particular character on the matrix. The DTMF voice recognition feature of the invention requires that the keypair be entered using two sequential keystrokes. The entry of a keypair is viewed as logical by the user in that it is dependent only upon the position of the character upon the matrix. The method is bidirectional in that the keypair for each character may be pressed in any order to access the corresponding binomial code.

Letter characters that are located adjacent to only one key, (A,B,C,K,N,T, and W) have a single key keypair and are entered by pressing the corresponding adjacent key twice. Characters that are located between and adjacent to two keys, (D,E,F,H,J,L,M,O,Q,-S,U,V,X,Z,bs,?, and the hyphen) have two key keypairs and are entered by sequentially pressing the two adjacent keys in any order to form the correct keypair. Characters that are located between and adjacent to four keys, (G,I,P,R,Y, and the period) have two, two key keypairs and are entered by sequentially pressing any two diagonally adjacent keys in any order.

Figure 5:
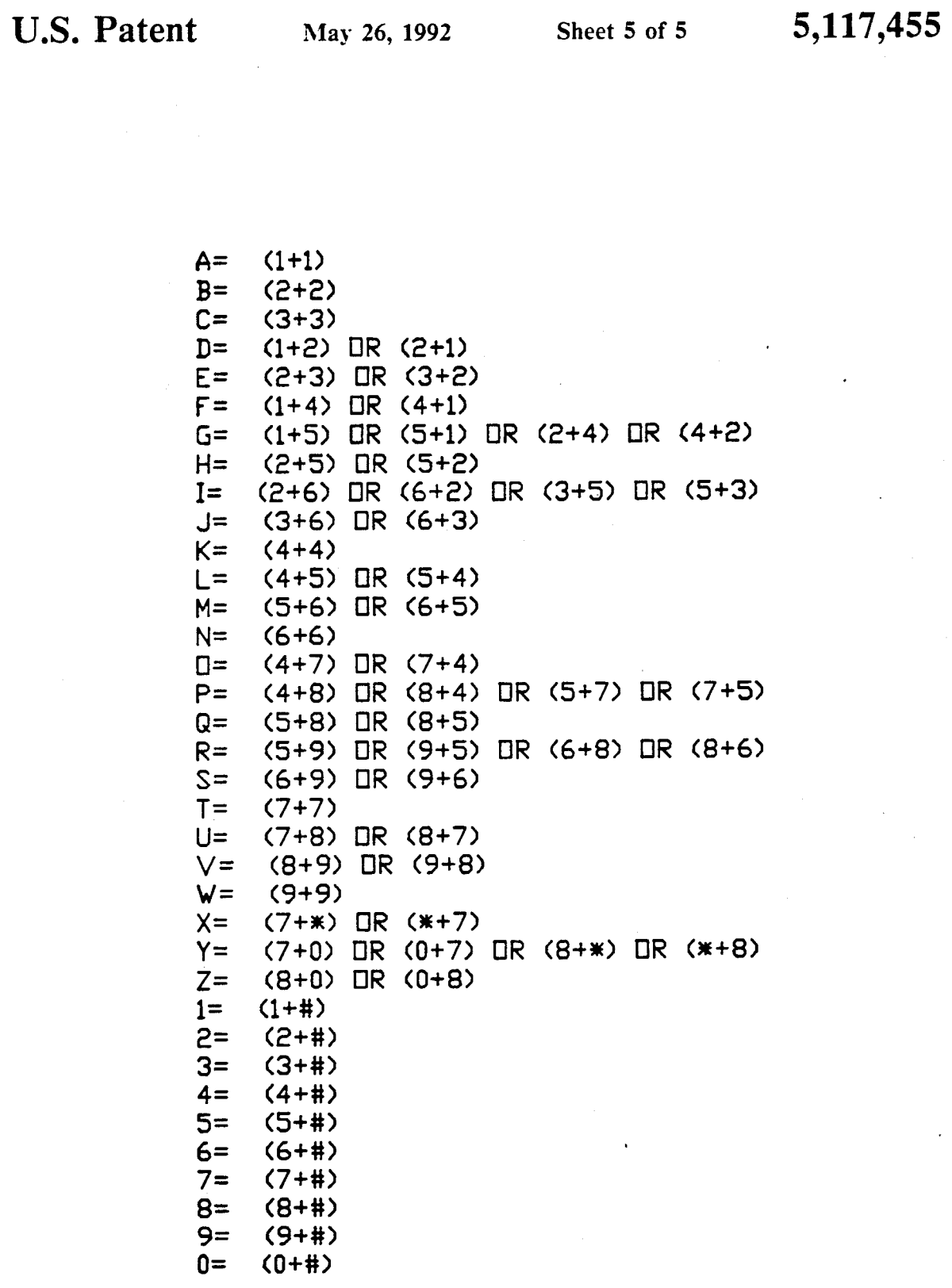

The cancel, space and enter functions have keypairs that are entered by pressing the respective adjacent key twice or by pressing the respective adjacent key once, followed by a pause. The sequences for entering all of the characters shown on matrix 16 are included in table form in FIG. 5.

The present invention permits the user to enter alphabetical and numeric characters within the same set of characters, for example, to enter a credit card number containing both letters and numbers. To enter the numeric character, the corresponding numeric key is pressed followed by the pressing of the "pound" sign key, or alternatively, by the pressing of any key that is located at least two rows or two columns distance from the numeric key. Referring now to FIG. 4 for example, the number 1 may be entered by pressing the number one key and by pressing any of the following keys: "star", zero, pound, or 3. Alternatively, the number 1 may be entered by pressing the correspondingly numbered key followed by a pause of sufficient duration to receive the tone signal "echo."

In accordance with one aspect (not shown) of the present invention using the same keypair codes discussed above, each of the prearranged alphanumeric characters is assigned to a single key on a separate keyboard which may be attached to a telephone unit. The keypair DTMF signal for each character is generated by pressing a single key. The separate keyboard may be provided with an alpha display which enables the user to view the selected entries.

In accordance with another aspect of the present invention, programming creates intelligent voice cards which directly echo the selected character back to the user without the necessity for prior decoder conversion and reconversion.

Here follows a code listing of a program in accordance with the present invention for providing keypair codes corresponding to alphabetic characters for storage and retrieval within the telephone system:

```
/*                                           */
/*   This program is written in Speak-Easy.  */
/*   It runs with the "Big Mouth"            */
/*   PC card, and allows the caller to enter */
/*   his/her name and phone number using     */
/*   the special "ALPHATONE" method of       */
/*   alphabet entry.                         */
/*   The obtained data is then saved on disk.*/
/*                                           */
/*   (C) Copyright Danish International 1990 */
/*                                           */
/*                                           */
/* definitions for speaking numbers and letters  */
/*                                           */
/*       Alpha-Tone Character codes */
/*                                  */

/*
 * Function speak - speak a string
 */
func speak()
{   s_ = @1 + "";             /* make it a string */
i_ = 0;
l_ = length(s_);
while(i_ < l_)
{   i_ = i_ + 1;
    c_ = mid(s_, i_, 1);
    play(letters[c_]);
}
}
/*                                           */
/*    Function Check if entry is correct*/
/*                                           */
func check_st()
{
    flushtone;
    DTMF_INT+;
    play(you_entered);
    if(@1 == "")
```

```
      play(nothing_);
   else
   speak(@1);
   DTMF_INT+;
   play(correct_);
   ans_ = tone(3);
   if(ans_ == 42)
      ans_ = 0;
   else
      ans_ = 1;
   return ans_;
}
/*                                              */
/*      Function get  alphanumeric string       */
/*              or numeric string               */
/*                                              */
/*      Syntax: alphanum(message x);            */         /*
/*           where x = "A" for alpha only  */
/*                     "N" for num only    */
/*                     "B" for both        */
/*                                              */
func alphanum()
{
   RECLINE- DTMF_INT-;
   flushtone;
   DTMF_INT+;
   cur_quest = @1;
   play(@1);
   beep(16000);
   let_ = "";
   au_string = "";
   while(1)
   {
ch_ = 1;
if(let_ == "#")
   ch_ = check_st(au_string);
if(let_ == "*" || ch_ == 0)
{
let_ = "";
```

```
au_string = "";
play(cancel_);
play(cur_quest);
beep(16000);
continue;
}
if(let_ == "#" && ch_ == 1)
 break;
au_string = au_string + let_;
first = tone(5);
if(first < 0)
{
 let_ = "#";
 continue;
}
if(@2 == "N")
    second = 99;
else
    second = tone(1);
if(second < 0)
    second = 99;
if(second == 99 && @2 == "A")
    second = first;
arg_ = "" + first + second;
let_ = code_char[arg_];
a = asc(let_);
if(a == 0)
{
    second = 99;
    arg_ = "" + first + second;
    let_ = code_char[arg_];
}
if(let_ == "")
break;
play(letters[let_]);
    }
return au_string;
}
print("Loading speak files...\r");
```

```
letters["A"] = file(voice, "A.VOX");
letters["B"] = file(voice, "B.VOX");
letters["C"] = file(voice, "C.VOX");
letters["D"] = file(voice, "D.VOX");
letters["E"] = file(voice, "E.VOX");
letters["F"] = file(voice, "F.VOX");
letters["G"] = file(voice, "G.VOX");
letters["H"] = file(voice, "H.VOX");
letters["I"] = file(voice, "I.VOX");
letters["J"] = file(voice, "J.VOX");
letters["K"] = file(voice, "K.VOX");
letters["L"] = file(voice, "L.VOX");
letters["M"] = file(voice, "M.VOX");
letters["N"] = file(voice, "N.VOX");
letters["O"] = file(voice, "O.VOX");
letters["P"] = file(voice, "P.VOX");
letters["Q"] = file(voice, "Q.VOX");
letters["R"] = file(voice, "R.VOX");
letters["S"] = file(voice, "S.VOX");
letters["T"] = file(voice, "T.VOX");
letters["U"] = file(voice, "U.VOX");
letters["V"] = file(voice, "V.VOX");
letters["W"] = file(voice, "W.VOX");
letters["X"] = file(voice, "X.VOX");
letters["Y"] = file(voice, "Y.VOX");
letters["Z"] = file(voice, "Z.VOX");
letters["."] = file(voice, "PERIOD.VOX");
letters["-"] = file(voice, "DASH.VOX");
letters["*"] = file(voice, "STAR.VOX");
letters["#"] = file(voice, "POUND.VOX");
letters[" "] = file(voice, "SPACE.VOX");
letters["1"] = file(voice, "ONE.VOX");
letters["2"] = file(voice, "TWO.VOX");
letters["3"] = file(voice, "THREE.VOX");
letters["4"] = file(voice, "FOUR.VOX");
letters["5"] = file(voice, "FIVE.VOX");
letters["6"] = file(voice, "SIX.VOX");
letters["7"] = file(voice, "SEVEN.VOX");
letters["8"] = file(voice, "EIGHT.VOX");
```

```
letters["9"] = file(voice, "NINE.VOX");
letters["0"] = file(voice, "ZERO.VOX");
cancel_ = file(voice, "CANCEL.VOX");
welcome = file(voice, "WELCOME.VOX");
bye_ = file(voice, "BYE.VOX");
you_entered = file(voice, "YOUENT.VOX");
correct_ = file(voice, "CORRECT.VOX");
nothing_ = file(voice, "NOTHING.VOX");
print("letters, numbers, and editing msgs loaded ok\n");

/*    This is the beginning of the program.  */
/*    The program uses the functions defined */
/*    above.                                  */
/*                                            */
/*        Load voice files                    */
/*                                            */
v_last_name = file(voice, "LNAME.VOX");
v_first_name = file(voice, "FNAME.VOX");
v_phone_num = file(voice, "Phonenum.VOX");
reset;
ringlevel(135);
   while(1)
{
code_char["4949"] = "A";
code_char["5050"] = "B";
code_char["5151"] = "C";
code_char["4950"] = "D";
code_char["5049"] = "D";
code_char["5051"] = "E";
code_char["5150"] = "E";
code_char["4952"] = "F";
code_char["5249"] = "F";
code_char["4953"] = "G";
code_char["5349"] = "G";
code_char["5250"] = "G";
code_char["5052"] = "G";
code_char["5053"] = "H";
code_char["5350"] = "H";
code_char["5054"] = "I";
```

```
code_char["5450"] = "I";
code_char["5153"] = "I";
code_char["5351"] = "I";
code_char["5154"] = "J";
code_char["5451"] = "J";
code_char["5252"] = "K";
code_char["5253"] = "L";
code_char["5352"] = "L";
code_char["5354"] = "M";
code_char["5453"] = "M";
code_char["5454"] = "N";
code_char["5255"] = "O";
code_char["5552"] = "O";
code_char["5256"] = "P";
code_char["5652"] = "P";
code_char["5355"] = "P";
code_char["5553"] = "P";
code_char["5356"] = "Q";
code_char["5653"] = "Q";
code_char["5357"] = "R";
code_char["5753"] = "R";
code_char["5456"] = "R";
code_char["5654"] = "R";
code_char["5457"] = "S";
code_char["5754"] = "S";
code_char["5555"] = "T";
code_char["5556"] = "U";
code_char["5655"] = "U";
code_char["5657"] = "V";
code_char["5756"] = "V";
code_char["5757"] = "W";
code_char["5542"] = "X";
code_char["4255"] = "X";
code_char["5548"] = "Y";
code_char["4855"] = "Y";
code_char["4256"] = "Y";
code_char["5642"] = "Y";
code_char["5648"] = "Z";
code_char["4856"] = "Z";
```

```
/*code_char["5635"] = ".";
code_char["3556"] = ".";
code_char["4857"] = ".";
code_char["5748"] = ".";
code_char["5735"] = "-";
code_char["3557"] = "-";*/
code_char["4848"] = " ";
code_char["4242"] = "*";
code_char["4299"] = "*";
code_char["3535"] = "#";
code_char["3599"] = "#";
code_char["4899"] = "0";
code_char["4999"] = "1";
code_char["5099"] = "2";
code_char["5199"] = "3";
code_char["5299"] = "4";
code_char["5399"] = "5";
code_char["5499"] = "6";
code_char["5599"] = "7";
code_char["5699"] = "8";
code_char["5799"] = "9";

hangup ;
    reset;
/*                                              */
/*      Wait for Call                           */
/*                                              */
    print(screen);
    print("\nWaiting for call\n");
    while(!qring)
      nap(100);
/*                                              */
/*      Pickup and ask for name and phone #     */
/*                                              */
    pickup;
    local;
    print("pick-up\n");
    play(welcome);
    last_name = alphanum(v_last_name, "A");
```

```
    if(last_name == "")
        stop;
    outfile = file(append, "NAMES.DAT");
    print(outfile, last_name + ", ");
    print(screen);
    print(last_name,", ");
    first_name = alphanum(v_first_name, "A");
    print(outfile, first_name + ", ");
    print(screen);
    print(first_name,", ");
    phone_num = alphanum(v_phone_num, "N");
    print(outfile, phone_num + "\n");
    outfile = 0;
    print(screen);
    print(phone_num,"\n");
    print("\ncall serviced\n");
    play(bye_);
    stop;
    hangup;
}
^Z
```

INDUSTRIAL APPLICABILITY

The present invention may be used in the international telephone communications industry. The present invention finds special application for telephone systems providing stock and commodity market information, merchandise and pricing information, name/address data entry for ordering services, weather information, telephone directory information, and travel information.

Although the presently preferred embodiment of the invention has been illustrated and discussed herein, it is contemplated that various changes and modifications will be immediately apparent to those skilled in the art after reading the foregoing description in conjunction with the drawings. For example, the software may be programmed so that all digital characters are entered by sequentially pressing the desired digital key and the "pound" sign key, or vice versa. Additional color-coded characters may be added to the matrix and entered by sequentially pressing the "star" key and the desired color-coded key. Accordingly, it is intended that the description herein is by way of illustration and should not be deemed limiting the invention, the scope of which being more particularly specified and pointed out by the following claims.

What is claimed is:

1. A method for the entry of numerical characters and alphabetical characters into a telephone system, the telephone system having a keypad, a speaker, a microphone, a receiving station, and memory, the method comprising:

prearranging the characters of the alphabet on the keypad so that only one character is placed between any two adjacent keys of the keypad; and defining at least one keypair for each alphabetical character by selecting at least one key adjacent to each character, the keypairs generating dual tone multifrequency signals corresponding to character codes stored within the memory of the telephone system, each keypair operated by two sequential keystrokes of the at least one adjacent key, in either sequence.

2. The method of claim 1 wherein the step of prearranging the characters over the keypad contains the further step of arraying the characters so that the separate sites are located above, below or between the keys of the keypad.

3. The method of claim 2 wherein the step of defining keypairs includes selecting at least one adjacent key, each keypair operated by two sequential keystrokes.

4. The method of claim 1, wherein the keypairs are defined by selecting keys as follows: selecting the adjacent key where the character is located adjacent to a single key, selecting the two adjacent keys where the character is located adjacent to and between two keys, selecting any two adjacent and diagonally aligned keys where the character is located adjacent to and diagonally between four keys.

5. The method of claim 4 wherein the two sequential operations required to enter keypairs having two adjacent keys further comprises pressing the two adjacent keys in any sequence.

6. The method of claim 2 comprising the further step of converting the accessed stored codes into voice signals for announcing back the entry sequences to the user.

7. The method of claim 2 wherein the steps for entering a digital character comprise sequentially pressing the correspondingly numbered key and pressing a key separated from said numbered key at least two interposed keys.

8. The method of claim 2 wherein the steps for entering a digital character comprise pressing sequentially pressing the correspondingly numbered key and pressing the pound sign key.

9. A matrix for entering alphanumeric characters into a telephone system, the matrix comprising a pattern of characters prearranged on a telephone keypad, the pattern arrayed so that only one character is placed between any two adjacent keys of the keypad.

10. The matrix of claim 9 wherein the pattern of characters defines an overlay means for attachment over the keypad of a conventional telephone hand set.

11. The matrix of claim 9 wherein each character occupies a separate key on a separate keyboard so that the dual tone multifrequency tone identifying each character is generated by pressing a single key, the separate keyboard for attachment to the telephone system.

12. A system for entering alphanumeric characters into a telephone station, the system comprising:
at least one telephone set having a push-button keypad, the keypad preconfigured so that only one alphabetic character is placed between any two adjacent keys of the keypad, each alphabetic character having an assigned keypair for generating a dual tone multifrequency tone, each assigned keypair operated by two sequential keystrokes of at least one key adjacent to the alphabetic character, the keystrokes in either sequence for keypairs having two keys;
a computer responsive to dual tone multifrequency tones, the computer having means for converting the dual tone multifrequency signal into digital signals; and
means for storing codes corresponding to the dual tone multifrequency tones.

13. The system of claim 12 further comprising computer means for converting digital signals into tone signals for enunciating messages back to a user.

14. The system of claim 12 further comprising means for echoing character selection back to the user without the necessity for signal conversion.

15. The system of claim 12 further comprising voice modem means for providing voice prompts to a user.

16. The system of claim 12 wherein each alphabetic character site is preconfigured upon an overlay means for attachment over the keypad of the telephone set.

* * * * *